United States Patent [19]
Lampani

[11] Patent Number: 5,507,199
[45] Date of Patent: Apr. 16, 1996

[54] SHIFTER WITH LOCKING COVER

[75] Inventor: Richard A. Lampani, Jenison, Mich.

[73] Assignee: Grand Haven Stamped Products, Grand Haven, Mich.

[21] Appl. No.: 182,780

[22] Filed: Jan. 18, 1994

[51] Int. Cl.$^6$ .............................. B60K 20/02; G05G 9/12; B25G 3/16
[52] U.S. Cl. .......................................... 74/473 P; 403/348
[58] Field of Search ............................ 74/473 P, 473 R; 403/350, 351, 352, 348

[56] References Cited

U.S. PATENT DOCUMENTS

| | | | |
|---|---|---|---|
| 2,496,928 | 2/1950 | Bing et al. | 403/348 |
| 3,422,697 | 1/1969 | Brown et al. | 74/473 P |
| 3,860,209 | 1/1975 | Strecker | 403/348 |
| 3,998,110 | 12/1976 | O'Brien et al. | |
| 4,245,521 | 1/1981 | Osborn | |
| 4,569,245 | 2/1986 | Feldt et al. | |
| 4,773,788 | 9/1988 | Ruhl | 403/348 |
| 5,025,709 | 6/1991 | Miyazaki | 403/348 |
| 5,188,399 | 2/1993 | Durina | 403/348 |
| 5,310,276 | 5/1994 | Bergers et al. | 403/348 |
| 5,315,918 | 5/1994 | Pierce | 403/348 |

OTHER PUBLICATIONS

Copending U.S. Patent Application Serial No. 08/194,408, filed Feb. 10, 1994, entitled Transmission Shifter, owned by assignee of present application.

*Primary Examiner*—Rodney H. Bonck
*Assistant Examiner*—David M. Fenstermacher
*Attorney, Agent, or Firm*—Price, Heneveld, Cooper, DeWitt & Litton

[57] ABSTRACT

A drop-in shifter for an automotive transmission is provided. The drop-in shifter includes a shift stick, a base including a socket, a semispherically-shaped pivot operably connected to the shift stick for pivotally mounting the shift stick to the socket on the base, and a spring positioned over a laterally extending rocker pin that extends from the shift stick for engaging the ends of the rocker pin to bias the shift stick to a centered neutral position. A cover is configured to mateably engage the base and retain the assembly together, the cover including protrusions configured to slidingly engage the base and then rotate under locking surfaces to securely retain the cover to the base. The cover holds the spring in a compressed position on the base and further retains the pivotable shift stick on the base without the need for separate fasteners. The cover can be assembled to the base without the need for separate fasteners, and includes a locking pin configured to interlockingly engage the base and prevent rotation and accidental disassembly once securely engaged therewith.

15 Claims, 2 Drawing Sheets

SHIFTER WITH LOCKING COVER

BACKGROUND OF THE INVENTION

The present invention concerns a shifter for an automotive transmission, and more specifically concerns a drop-in shifter having a base and a cover configured to assemble to the base in a manner that facilitates ease of assembly.

Drop-in shifters are commonly used with manually shifted transmissions for vehicles. Typically, the drop-in shifters are assembled at a manufacturing facility using various tools, fixturing and machinery. However, there is a desire to make the drop-in shifters modular in design and delay their assembly to reduce the need for costly preassembled inventories. For example, this would allow specific shift sticks and springs to be selected and assembled to the drop-in shifter immediately prior to installation into a vehicle, thus allowing the assembly process to accommodate a "custom build". Further, it is desirable to minimize the cost of assembly and further simplify the assembly process so that the assembly can be readily completed at diverse locations without the need for special tools and highly skilled labor. For example, this is particularly desirable where the drop-in shifter components are manufactured in one location and then shipped overseas for later assembly. Still further, it is desirable to keep the number of parts required for assembly to a minimum. Thus, a shifter solving the aforementioned problems is desired.

SUMMARY OF THE INVENTION

In one aspect, the present invention includes a drop-in shifter for an automotive transmission including an elongated pivotable shift stick for changing the drive ratio of the transmission when the shift stick is pivoted, a base adapted for mounting the shifter to a vehicle, a pivot for pivotally mounting the shift stick to the base, and a spring for biasing the shift stick to a neutral position on the base. A cover is configured to engage the base, with one of the base and the cover including interlocking surfaces, and the other of the base and the cover including protrusions configured to engage the interlocking surfaces. The cover is further configured to retain one or both of the spring and the shift stick to the base when the cover is secured to the base by the protrusions.

In another aspect, the present invention includes a method including providing a shifter base, a cover, and components including a shift stick to be retained to the shifter base by the cover, one of the base and the cover including interlocking surfaces and the other of the base and the cover including interlocking surface engaging protrusions. The methods further includes assembling the cover to the base including engaging the protrusions with the interlocking surfaces to hold the cover, the base, and the components together.

These and other features and advantages of the present invention will be further understood and appreciated by those skilled in the art by reference to the following specification, claims and appended drawings.

DETAILED DESCRIPTION OF PREFERRED EMBODIMENTS

Figure 1:
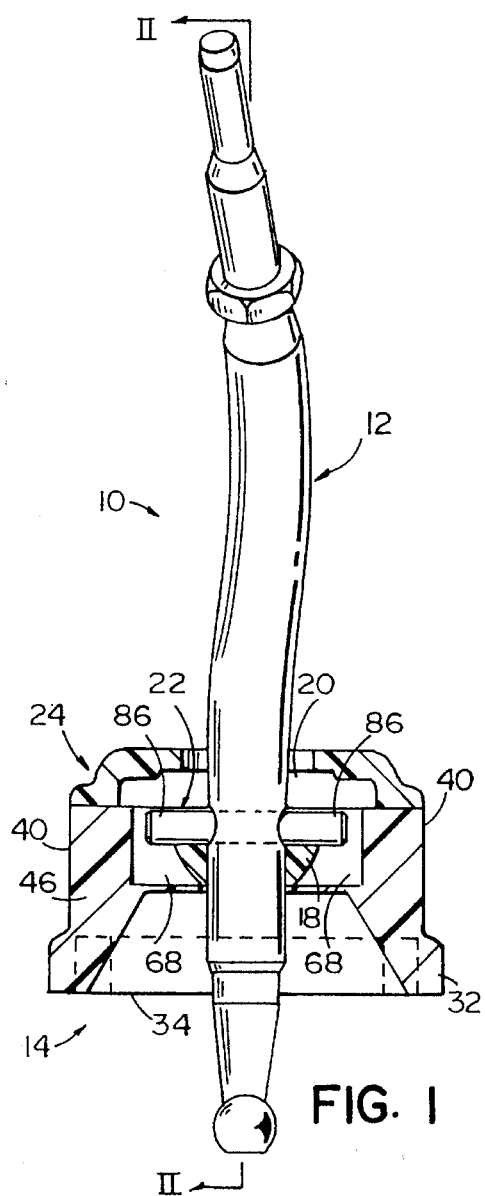
FIG. 1 is a front elevational cross-sectional view of a drop-in shifter embodying the present invention.
Figure 2:
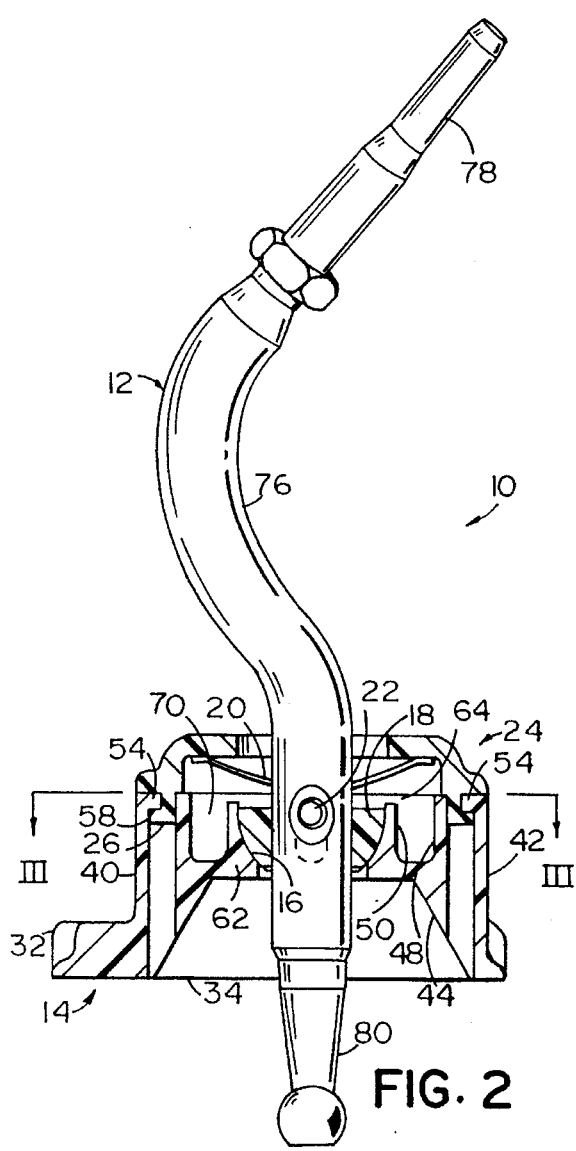
FIG. 2 is a cross-sectional view taken along the plane II—II in FIG. 1.

A drop-in shifter 10 (FIGS. 1–3) for an automotive transmission embodying the present invention is provided. The drop-in shifter 10 includes a shift stick 12, a base 14 defining a socket 16, and a semispherically-shaped pivot 18 operably connected to shift stick 12 for pivotally mounting shift stick 12 to socket 16 on base 14. A spring 20 is positioned over a laterally extending rocker pin 22 that extends from shift stick 12. Rocker pin 22 includes ends that engage spring 20 to bias the shift stick 12 to a neutral position. A cover 24 is configured to engage base 14. Cover 24 includes protrusions 26 configured to slidingly engage base 14 and then rotate under interlocking surfaces 28 on base 14 to securely retain cover 24 to base 14. Cover 24 holds spring 20 in a compressed position on base 14 and further retains pivotable shift stick 12 on base 14 without the need for separate fasteners. Advantageously, cover 24 can be readily assembled to base 14 without the need for tools or highly skilled labor.

Base 14 (FIGS. 1–3) is a molding made of structural polymeric material such as glass filled nylon. Base 14 includes a lower section 32 having a lower surface 34 shaped to mateably engage a vehicle, and includes flanges 36 with holes 37 for secure attachment to the vehicle. An upper section 40 extends upwardly from lower section 32. Upper section 40 includes a cylindrically-shaped outer annular wall 42 and a pivot forming inner section 44 secured to annular wall 42 by boss-like ribs 46. The inside surface 48 of outer annular wall 42 and the outside surface 50 of inner section 44 define circumferentially extending slots 52 that extend between ribs 46. Ledges 54 extend into slots 52 from outer annular wall 42 proximate the upper surface 56 of annular wall 42, and extend about half way around the length of slots 52. Each ledge 54 defines a blind surface or interlocking surface 58 on its underside, the purpose of which is discussed below. An anti-rotation hole 60 is located in the top of one or more of boss-like ribs 46.

Pivot forming inner section 42 includes a wall structure 62 defining a recess 64 having the semispherically-shaped pivot forming surface or socket 16 at its lower end. A pair of opposing slots 68 extend from recess 64 into wall structure 62. Wall structure 62 further includes a pair of opposing C-shaped depressions 70 extending circumferentially in wall structure 62 between slots 68. C-shaped depressions 70 are configured to reduce the concentrated mass of material in wall structure 62 thus facilitating molding. Reinforcement ribs 72 extend across the ends of C-shaped depressions 70 to reinforce the inner and outer parts of wall structure 62. Further, reinforcement ribs 72 act as guides to control and guide the movement of a rocker pin 22 on shift stick 12.

Shift stick 12 includes an elongated shaft 76 having an upper end 78 and a lower end 80. The upper end 78 provides a handle for manually grasping, and the lower end 80 provides a lever adapted for insertion into an automotive transmission for changing the drive ratio of the transmission when the shift stick is pivoted. Semicylindrically-shaped pivot 18 is secured on lower end 80 of elongated shaft 76, and rocker pin 22 with laterally extending ends 86 is extended through elongated shaft 76 immediately above pivot 18. Pivot 18 is configured to operably engage pivot forming surface 16 of base 14, with rocker pin ends 86 extending into opposing slots 68. Thus, shift stick 12 is pivotally supported on base 14 for pivotable movement in orthogonal directions, one of which orthogonal directions pivots shift stick 12 about an axis parallel rocker pin 84 and the other of which pivots about an orthogonal axis to rocker pin 22.

Spring 20 (FIG. 2) has a preformed leaf-spring-like shape and is positioned around elongated shaft 76 above rocker pin ends 86. Notably, multiple springs 20 can be stacked and used if desired. As shift stick 12 is pivoted in a side-to-side direction in neutral, rocker pin ends 86 engage the sides of spring 20, thus causing spring 20 to bias shift stick 12 toward a centered neutral position.

Cover 24 (FIGS. 4–7) is configured to engage base 14 and compress spring 20 without the use of separate tools and fasteners. Cover 24 is generally ring-shaped and is a one-piece molding of polymeric materials. Cover 24 includes an aperture 94 configured to receive elongated shaft 76 of shift stick 12. The underside 96 defines a pocket for receiving spring 20, and includes a contoured surface with ribs 98 for capturing spring 20 and preventing unacceptable rotation thereof.

Figure 3:
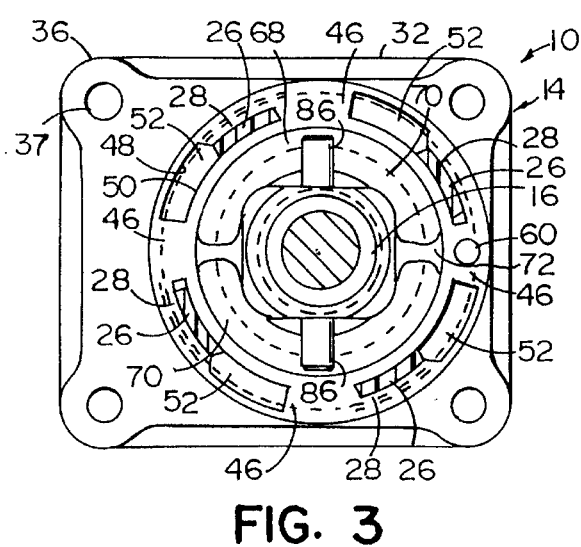
FIG. 3 is a cross-sectional view taken along the plane III—III in FIG. 2.
Figure 3A:
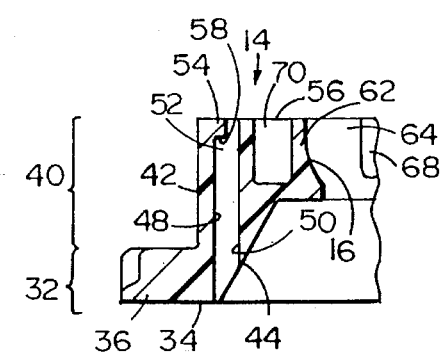
FIG. 3A is a fragmentary cross-sectional view of the base as shown in FIG. 3.
Figure 4:
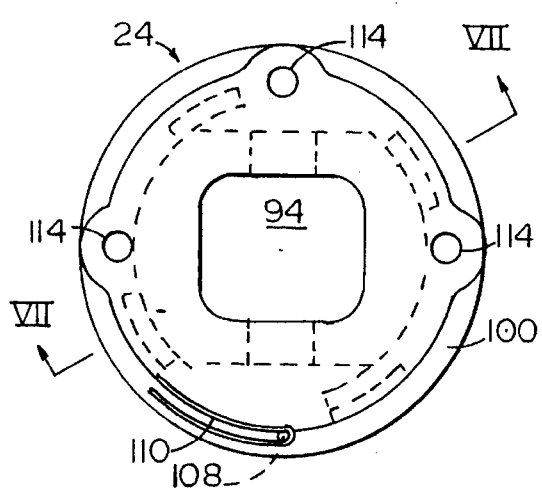
FIG. 4 is a top view of the cover shown in FIG. 1.

The outer radially section of cover 24 is defined by an annular flange 100 particularly configured to engage base 14. In particular, flange 100 includes protrusions 102 having a hook-shaped end 104. Protrusions 102 are configured to slidingly telescopingly engage circumferentially extending slots 52 in base 14, and the lower surface 106 of flange 100 is substantially planar for mateably engaging the top of base 14. Once cover 24 is mateably telescopingly received on base 14 with protrusions 102 fully extended into slots 52, cover 24 can be rotated so that hook-shaped ends 104 slide under and interlockingly engage with interlocking surfaces 58. This provides a pull-out strength on cover 24 of greater than about 10,000 pounds. Notably, outer wall 40 prevents disengagement of protrusions 102 from interlocking surfaces 28. A locking pin 108 is operably held on a resiliently flexible arm 110. Resiliently flexible arm 110 extends circumferentially within flange 100, with locking pin 108 extending below lower surface 106 of flange 100. As cover 24 is rotated, an inclined surface 112 (FIG. 6) on locking pin 108 ramps locking pin 108 onto a selected one of boss-like ribs 46 (FIG. 3). This causes flexible arm 110 to flex. As cover 24 reaches its final position, locking pin 108 snap locks into hole 60 due to the biasing force from flexible arm 110. Notably, a hole 60 can be positioned on one or more of boss-like ribs 46, and additional locking pins 108 can be provided if desired. Further, holes 114 (FIG. 4) can be added to cover flange 100 such as for receiving a pin or screw if desired.

Figure 9:
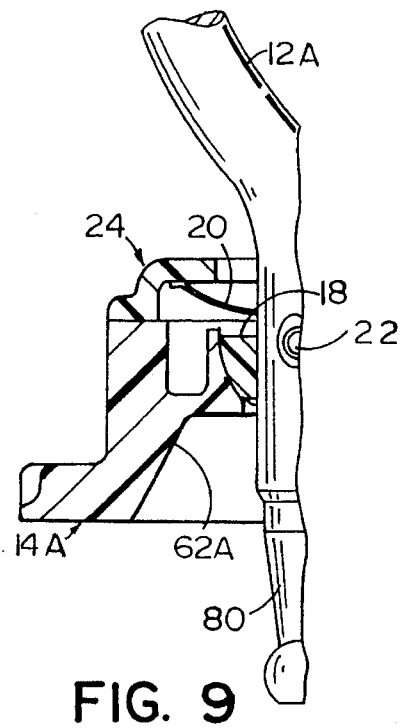
FIG. 9 is a fragmentary side elevational cross-sectional view of the modified drop-in shifter shown in FIG. 8, the view being comparable to FIG. 2.
Figure 5:
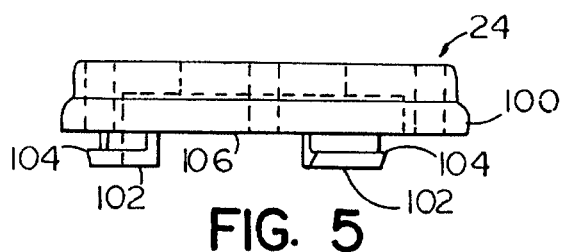
FIG. 5 is a side view of the cover shown in FIG. 4.
Figure 6:
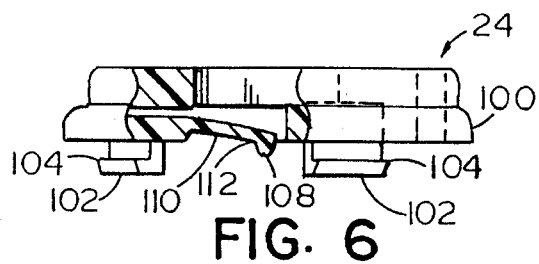
FIG. 6 is a side view identical to FIG. 5 but partially broken away.
Figure 7:
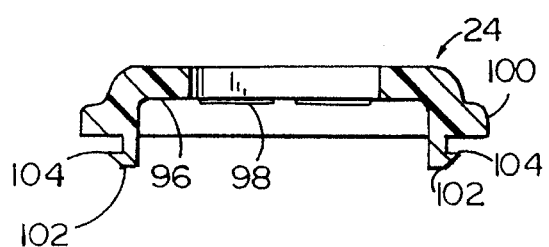
FIG. 7 is across-sectional view taken along the lines VII—VII in FIG. 4.
Figure 8:
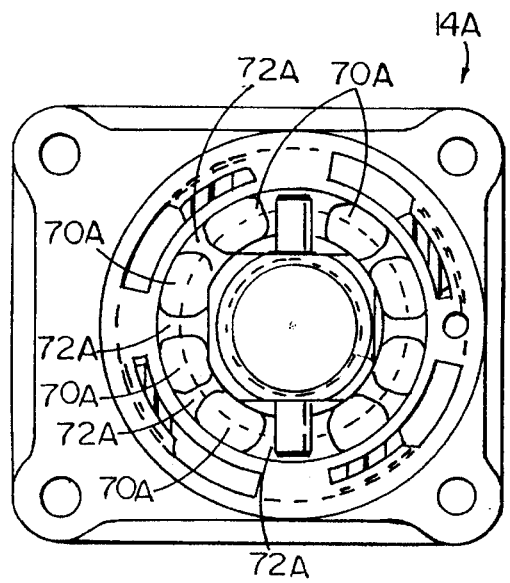
FIG. 8 is a plan, cross-sectional view of a second embodiment of a drop-in shifter including a modified shifter base, FIG. 8 being shown in a manner comparable to FIG. 3.

A modification of shifter base 14 is shown in FIGS. 8 and 9 and generally referred to as shift base 14A. Shift base 14A is identical to base 14 except that shift base 14A includes multiple reinforcement ribs 72A extending across C-shaped depressions 70A between portions of wall structure 62A for increased stability and structural rigidity.

Thus, a shifter is provided including a base and cover configured to facilitate assembly without the need for tools or highly skilled labor.

In the foregoing description it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A drop-in shifter for an automotive transmission comprising:

an elongated pivotable sift stick having an upper end and a lower end and further including a rocker pin, said upper end being manually actuatable and said lower end having a lever adapted for insertion in said automotive transmission for changing the drive ratio of the transmission when said shift stick is pivoted;

a base adapted for mounting said shifter to a vehicle;

a pivot for pivotally mounting said shift stick to said base;

a spring configured to operably engage said rocker pin to bias said shift stick to a centered neutral position on said base when held in a compressed tensioned condition against said rocker pin; and a cover defining with said base a generally vertical axis of installation, said cover being configured to compressively engage and operably secure said spring in the tensioned condition against said rocker pin, one of said base and said cover including a first end with circumferentially extending slots and adjacent interlocking surfaces, and the other of said base and said cover including a second end for abuttingly engaging the first end and further including protrusions extending axially from the second end and configured to matingly engage the slots along the axis of installation in a manner preventing undesired flexing of the protrusions, said protrusions further being configured to rotatingly interlockingly engage said interlocking surfaces when rotated about said axis.

2. The drop-in shifter as defined in claim 1 wherein said protrusions include hook-shaped radially extending ends for engaging said interlocking surfaces.

3. The drop-in shifter as defined in claim 2 wherein said one of said base and said cover include a slot, and said protrusions telescoping into said slot and are rotatable to engage said interlocking surfaces.

4. The drop-in shifter as defined in claim 3 wherein said one of said base and said cover include a locking tab to prevent rotating said protrusions to unlock said cover and said base once said cover and said base are interlockingly engaged.

5. The drop-in shifter as defined in claim 1 wherein said base includes circumferentially extending slots including said interlocking surfaces, and said cover includes said protrusions, said protrusions being configured to telescopingly engage said slots and said cover being rotatable on said base to engage said protrusions with said interlocking surfaces.

6. The drop-in shifter as defined in claim 5 wherein one of said cover and said base includes a locking tab engageable with a recess in the other of said cover and said base to prevent disengagement of said protrusions with said interlocking surfaces once interlockingly engaged.

7. The drop-in shifter as defined in claim 1 wherein said base is a molded polymeric pan and said cover is a molded polymeric pan, said base and said cover each being integrally molded with one of said interlocking surfaces and said protrusions.

8. The drop-in shifter as defined in claim 1 wherein said base defines a socket, and said pivot includes a spherically-shaped section operably connected to said shift stick, said spherically-shaped section operably engaging said socket to pivotally support said shift stick.

9. The drop-in shifter as defined in claim 1 wherein said base includes an inner pivot forming structure and an outer wall defining a circumferentially extending slot therebetween, one of said inner pivot forming structure and said outer wall including said interlocking surfaces.

10. The drop-in shifter as defined in claim 1 wherein said protrusions engage said interlocking surfaces in a manner providing a tensile pull-out strength on said cover of greater than about 10,000 pounds.

11. The drop-in shifter as defined in claim 1 wherein said cover and said base are configured to telescopingly engage with said protrusions being positioned adjacent said interlocking surfaces, and wherein said cover and said base are further configured so that said cover can be rotated to twist lock said protrusions onto said interlocking surfaces, whereby said cover can be secured to said base without the use of separate fasteners.

12. A method of assembling a shifter for an automotive transmission, comprising:

providing a shifter base, a cover, a shift-stick-biasing spring and a shift stick, the shift stick including a rocker pin configured to be engaged by the spring to bias the shift stick to a neutral position, said base and said cover including first and second integrally molded first and second mating connectors, respectively;

assembling said shifter base, said cover, said spring and said sift stick together including joining said mating connectors of in a first direction, said spring being held in a tensioned condition against said rocker pin to bias said shift stick to the neutral position on said base;

initially rotating said cover about an axis parallel said first direction toward a fully assembled position to secure said cover to said shifter base with said shift stick and said spring being operatively held therebetween; and finally rotating said cover onto said base to the fully assembled position wherein said cover is locked onto said base without the sue of a separate fastener member and without the need for a separate secondary assembly operation.

13. The method as defined in claim 12 including providing a resilient member that engages said base to lock said cover against rotation on said base during said step of finally rotating said cover.

14. A drop-in shifter for an automotive transmission comprising:

an elongated pivotable shift stick having an upper end for supporting a handle, a lower end for engaging a transmission and including a ball-section-shaped pivot and a transversely oriented rocker pin located between said upper and lower ends;

a polymeric base adapted for mounting said shifter to a vehicle and including an integrally molded-in first connecting structure and further including mating structure for pivotally supporting said pivot, said first connecting structure including concentric annular walls defining circumferentially extending slots and interlocking surfaces;

at least one plate spring for biasing said shift stick to a centered neutral position on said base; and a dome-shaped polymeric cover including an end and integrally molded-in second connecting structure extending axially from the end for rotatably interlockingly engaging said first connecting structure to hold the sift stick in operataive engagement with the base and the at least one spring, said cover being configured to abuttingly engage a top surface on the base and to operably compress said at least one spring plate against said rocker pin when said first and second connecting structures are interlockingly engaged and further being configured to support substantial tensile forces generated to said cover as said shift stick is pivoted between gear positions on said transmission.

15. The drop-in shifter defined in claim 14 wherein one of the first and second connecting structures include an integrally molded-in resilient arm for snap-locking said cover in a fully assembled position.

* * * * *